(12) United States Patent
Liang

(10) Patent No.: US 12,018,430 B2
(45) Date of Patent: Jun. 25, 2024

(54) FLAME-RETARDANT ULTRAVIOLET-RESISTANT ARAMID FIBER

(71) Applicants: NANTONG TEXTILE & SILK INDUSTRIAL TECHNOLOGY RESEARCH INSTITUTE, Nantong (CN); SOOCHOW UNIVERSITY, Suzhou (CN)

(72) Inventor: Guozheng Liang, Suzhou (CN)

(73) Assignees: NANTONG TEXTILE & SILK INDUSTRIAL TECHNOLOGY RESEARCH INSTITUTE, Nantong (CN); SOOCHOW UNIVERSITY, Suzhou (CN)

(*) Notice: Subject to any disclaimer, the term of this patent is extended or adjusted under 35 U.S.C. 154(b) by 640 days.

(21) Appl. No.: 17/349,802

(22) Filed: Jun. 16, 2021

(65) Prior Publication Data

US 2021/0310184 A1 Oct. 7, 2021

Related U.S. Application Data

(63) Continuation of application No. PCT/CN2018/121869, filed on Dec. 18, 2018.

(51) Int. Cl.
| | |
|---|---|
| *D06M 13/328* | (2006.01) |
| *B82Y 30/00* | (2011.01) |
| *B82Y 40/00* | (2011.01) |
| *D06M 13/513* | (2006.01) |
| *D06M 13/52* | (2006.01) |
| *D06M 101/36* | (2006.01) |

(52) U.S. Cl.
CPC ........ *D06M 13/328* (2013.01); *D06M 13/513* (2013.01); *D06M 13/52* (2013.01); *B82Y 30/00* (2013.01); *B82Y 40/00* (2013.01); *D06M 2101/36* (2013.01); *D06M 2200/25* (2013.01); *D06M 2200/30* (2013.01)

(58) Field of Classification Search
CPC .. D06M 13/328; D06M 13/513; D06M 13/52; D06M 2101/36; D06M 2200/25; D06M 2200/30; B82Y 30/00; B82Y 40/00
See application file for complete search history.

(56) References Cited

FOREIGN PATENT DOCUMENTS

| CN | 103572583 A | * | 2/2014 |
|---|---|---|---|
| CN | 103572583 A | | 2/2014 |
| CN | 107216689 A | | 9/2017 |
| CN | 108642862 A | | 10/2018 |
| CN | 109652977 A | | 4/2019 |
| JP | 2001139925 A | | 5/2001 |
| WO | 2012117238 A1 | | 9/2012 |

* cited by examiner

*Primary Examiner* — Amina S Khan
(74) *Attorney, Agent, or Firm* — SZDC Law PC

(57) ABSTRACT

A flame-retardant ultraviolet-resistant aramid fiber, the preparation method therefor comprising the following steps: adding nanoparticles into a hydrogen peroxide solution, performing magnetic stirring for 0.5-1 h, adding a sulfuric acid solution, and further performing magnetic stirring for 0.5 h; performing filtering to obtain a filter cake, and washing the filter cake with water and drying same to obtain modified particles; modifying the modified particles with curcumin and dopamine to obtain organic substance-modified particles; and finally subjecting the organic substance-modified particles to a reaction with a silicon methoxylated aramid fiber, so as to obtain a surface-modified aramid fiber. The present invention has high ultraviolet absorption and extremely low catalytic activity, avoiding damage to a fiber structure by photocatalysis in a radiation process, and in particular improving flame retardancy of the aramid fiber.

10 Claims, No Drawings

FLAME-RETARDANT ULTRAVIOLET-RESISTANT ARAMID FIBER

This application is a Continuation Application of PCT/CN2018/121869, filed on Dec. 18, 2018, which is incorporated by reference for all purposes as if fully set forth herein.

TECHNICAL FIELD

The invention relates to a surface modification technology of aramid fiber, in particular to a flame-retardant ultraviolet-resistant aramid fiber.

BACKGROUND TECHNIQUE

In recent years, in order to improve the surface activity and ultraviolet resistance of aramid fibers, an ultraviolet shielding agent has been introduced on the surface of the aramid fiber. UV shielding agents are classified into organic UV shielding agents and inorganic UV shielding agents. However, organic ultraviolet shielding agents have poor heat resistance and oxidation resistance. These problems are well controlled in inorganic UV screening agents, but there is a problem of high catalytic activity, which brings the risk of photocatalytic degradation of organic fibers; in addition, the binding force of inorganic materials and organic fibers is limited, during use. There will be problems with shedding, which will affect the reliability of service.

In addition, in some special occasions, such as firefighters, steelworkers, electric welders, chemical plant workers, oil refinery workers and oil field drilling workers, the tooling and combat uniforms of army soldiers need flame retardant training B, and There is also a need for flame retardant and no melting droplets to avoid secondary burns; in many civil occasions, such as hotels, halls, stage decorations, as well as seat covers, curtains, bedding for aircraft, trains and automobiles Other decorations and children's clothing should also have flame retardant functions.

The research group of the inventors has developed a new type of aramid fiber both with surface activity and UV resistance, which has better UV resistance effect, but does not involve flame retardancy.

TECHNICAL PROBLEM

The present invention aims to develop an inorganic ultraviolet modifier maintain the mechanical properties and thermal properties of the fiber without reducing the chemical bonding. With a new type of coating with stronger adhesion is formed on the surface of the aramid fiber to impart high surface activity and UV resistance to the modified aramid fiber.

TECHNICAL SOLUTION

In order to achieve the above object, the technical solution adopted by the present invention is:

A flame-retardant ultraviolet-resistant aramid fiber, and the aramid fiber is prepared by a method including the following steps:
(1) dissolving the cerium salt and inorganic base in water, stirring for 20 to 45 min, adding hydrogen peroxide to obtain the suspension, adjusting the PH of the suspension to 10 to 14, reacting at 20 to 25° C. for 10 to 20 h, washing and filtering, drying, calcining at 500 to 800° C. for 1 to 3 h to obtain the nano-cerium oxide; dispersing the nano-cerium oxide, the boron source and the nitrogen-containing compound in the mixed solution of ethanol and water, ultrasonic agitation for 0.5 to 1.5 h, steaming and drying, then dispersed in the aqueous solution of cobalt nitrate, ultrasonic agitation for 0.5 to 1 h, then steaming and drying to obtain the solid substance; the solid substance calcining at 850 to 950° C. for 13 to 15 h under the nitrogen source gas, and then crushed to obtain nanoparticles;
(2) adding the nanoparticles into the hydrogen peroxide solution, magnetic stirring for 0.5 to 1 h, then add sulfuric acid solution, and continue to magnetic stirring for 0.5 h; then filter to obtain the filter cake, and then the filter cake is washed and dried to obtain modified particles;
(3) adding the modified particles and dopamine hydrochloride to buffer having the pH of 8.3 to 8.8; and stirring at room temperature for 2 to 3 hours; then add the curcumin ethanol solution and continue to stir for 1-2 h; and then the filter cake is washed and dried to obtain organic modified particles;
(4) immersing the silicon methoxylated aramid fiber in aqueous solution of trimethylsilanol, and shaking for 0.5 to 1 h; and then immersing in an aqueous solution of organic modified particles, the shaking at 70° C.-80° C. for 2-3 h; after that washed and dried to obtain the flame-retardant ultraviolet-resistant aramid fiber.

A method for preparing the flame-retardant ultraviolet-resistant aramid fiber includes the following steps:
(1) dissolving the cerium salt and inorganic base in water, stirring for 20 to 45 min, adding hydrogen peroxide to obtain the suspension, adjusting the PH of the suspension to 10 to 14, reacting at 20 to 25° C. for 10 to 20 h, washing and filtering, drying, calcining at 500 to 800° C. for 1 to 3 h to obtain the nano-cerium oxide; dispersing the nano-cerium oxide, the boron source and the nitrogen-containing compound in the mixed solution of ethanol and water, ultrasonic agitation for 0.5 to 1.5 h, steaming and drying, then dispersed in the aqueous solution of cobalt nitrate, ultrasonic agitation for 0.5 to 1 h, then steaming and drying to obtain the solid substance; the solid substance calcining at 850 to 950° C. for 13 to 15 h under the nitrogen source gas, and then crushed to obtain nanoparticles;
(2) adding the nanoparticles into the hydrogen peroxide solution, magnetic stirring for 0.5~1 h, then add sulfuric acid solution, and continue to magnetic stirring for 0.5 h; then filter to obtain the filter cake, and then the filter cake is washed and dried to obtain modified particles;
(3) adding the modified particles and dopamine hydrochloride to buffer having the pH of 8.3 to 8.8; and stirring at room temperature for 2 to 3 hours; then add the curcumin ethanol solution and continue to stir for 1~2 h; and then the filter cake is washed and dried to obtain organic modified particles;
(4) immersing the silicon methoxylated aramid fiber in, and shaking for 0.5 to 1 h; and then immersing in an aqueous solution of organic modified particles, the shaking at 70° C.~80° C. for 2~3 h; after that washed and dried to obtain the flame-retardant ultraviolet-resistant aramid fiber.

In the present invention, the silicon methoxylated aramid fiber is described in the invention application of No. 2018104223562; wherein the aramid fiber is the para-aramid fiber or a meta-aramid fiber.

In the present invention, the alkali metal hydroxide is sodium hydroxide, potassium hydroxide or a combination thereof; the cesium salt is cerium nitrate, cerium chloride, or a combination; boron source is boric acid or metaboric acid; the nitrogen-containing compound is urea, melamine, or ammonium bromide.

In the present invention, the mass ratio of the nano-cerium oxide, the boron source, the nitrogen-containing compound, cobalt nitrate is 100:(30 to 50):(60 to 120):(10 to 13). In the present invention, cobalt nitrate is added after the mixed adsorption of nano-plutonium oxide, boron source, and nitrogen-containing compound to reduce the disadvantage for boron nitride coating. At the same time, cobalt is adsorbed on the surface of nano-plutonium oxide. The presence of cobalt is believed to improve the reactivity of nanoparticles, especially the interfacial reactivity with aramid fiber, which is beneficial to the adhesion of nanoparticles on the surface of aramid fiber, thereby improving the flame retardancy. In addition, cobalt may increase the performance of the bond at the aramid interface is beneficial to improve the flame retardancy at the interface.

In the present invention, the mass ratio of the cerium salt and the inorganic base is 100:(20 to 50); the nitrogen source gas is nitrogen or ammonia; the buffer is one of Tris-HCl or disodium hydrogen phosphate-sodium dihydrogen phosphate buffer. The mass ratio of the nanoparticles, hydrogen peroxide solution, and sulfuric acid solution is 100:(60 to 70):(5 to 7). The mass concentration of hydrogen peroxide solution and sulfuric acid solution is 30% and 98%. This is the first disclosure of the present invention, it can form microgrooves on the surface of nanoparticles, which should be caused by oxidative etching, and can also increase the surface active groups such as hydroxyl groups on the surface of nanoparticles. This is beneficial to improve the reactivity and interface effect of nanoparticles.

In the present invention, the mass ratio of the modified particles, dopamine hydrochloride, curcumin is 100:(30 to 50):(8 to 12). A small amount of curcumin combined with successive reactions has little effect on the reaction of dopamine hydrochloride on the surface of the modified particles, and at the same time, curcumin can react to the surface of the particles, which is beneficial to improve the interface effect between the particles and the aramid. It can be seen from the comparison of the examples that turmeric The addition of element improves the binding force of particles on the surface of aramid.

In the present invention, the mass ratio of the silicon methoxylated aramid fiber, the organic modified particles and trimethylsilanol is 1:(2 to 9):(0.3 to 0.35). On one hand, the addition of trimethylsilanol is compatible with the silicon methoxy group on the surface of aramid, on the other hand, it can react with curcumin and dopamine to a certain extent, and more importantly, it can cooperate with boron nitride to improve flame retardant performance; as can be seen from the examples, the addition of trimethylsilanol is beneficial to flame retardancy.

In the present invention, the preparation method of silicon methoxylated aramid fiber can be exemplified as follows, by mass,
(1) The aramid fiber is sequentially immersed in acetone, petroleum ether and deionized water, each for 2 to 4 hours, and then washed and dried to obtain the surface-cleaned aramid fiber.
(2) 1 Part of the surface-cleaned aramid fiber is immersed in an alcohol solution of an alkali metal hydroxide having a mass concentration of 5.0 to 15.0% by weight, a reaction is carried out for 4 to 8 hours at a temperature of 50° C. to 80° C., and the aramid fiber is washed and dried to obtain an aramid fiber grafted with amino and carboxyl groups on the surface;
(3) 1 Part of the aramid fiber grafted with amino and carboxyl groups on the surface obtained in the step (2) is immersed in 150 to 350 parts of an organic solvent containing 100 to 200 parts of γ-glycidoxypropyltrimethoxysilane under an inert gas atmosphere, reacting at a temperature of 50 to 100° C. for 10 to 18 hours to obtain a silicon methoxylated aramid fiber.

BENEFICIAL EFFECT

Compared with the prior art, the beneficial effects achieved by the present invention are:
1. The invention is based on the modification of polydopamine to make the inorganic nanoparticles and the surface of the aramid fiber chemically connected, and the nanoparticles are treated with hydrogen peroxide and sulfuric acid solution to obtain modified particles with improved surface structure and activity, which further improves the reactivity of the nanoparticles.
2. The novel inorganic nano modifier provided by the invention is a polydopamine modified chaotic boron nitride coated cerium oxide, which has high ultraviolet absorption, high heat resistance and low photocatalytic activity. Through the addition of cobalt, the adhesion to nanoparticles is improved, which is beneficial to flame retardancy.
3. The present invention significantly improves the flame retardant effect through the synergistic effect of nanoparticles, the interface between the nanoparticles and the aramid fiber and the silanol on the surface of the aramid fiber with good flame retardancy, and has little effect on the ultraviolet resistance.

EMBODIMENTS OF THE INVENTION

Reference CN2018104223562:
(1) 1 g of aramid fiber (Kevlar-49, diameter 12 μm, density 1.45 g/m3, manufactured by DuPont, USA) was sequentially immersed in 70° C. acetone, 75° C. petroleum ether and 115° C. deionized water, each for 3 h; the fiber was taken out and dried in a vacuum oven at 80° C. to obtain a surface-cleaned aramid fiber, which was recorded as KF;
(2) 10.5 g of sodium hydroxide was dissolved in 120 mL of ethanol to prepare an ethanol solution A of sodium hydroxide; the surface-cleaned aramid fiber KF obtained in the step (1) was immersed in the solution A; the reaction solution was shaken at 65° C. for 5 hours; after the reaction was completed, the aramid fiber was washed and dried to obtain an aramid fiber grafted with amino group and carboxyl groups on the surface;
(3) 0.25 g of aramid fiber grafted with amino and carboxyl groups on the surface and 30 mL of γ-glycidoxypropyltrimethoxysilane were added to 70 mL of ethanol, and reacted at 70° C. for 12 hours under a nitrogen atmosphere; after the reaction was complete, the fiber is taken out to obtain an aramid fiber having a silicon methoxy group on the surface.

Example 1

1. Preparation of Modified Aramid Fiber
(1) 12.32 g of cerium chloride and 6 g of sodium hydroxide are dissolved in an aqueous solution, stirred for 35 minutes to obtain a suspension A; hydrogen peroxide is added, the pH of the suspension A is adjusted to 12 with sodium hydroxide, and the reaction is conducted at 40° C. for 12 hours, filtered, washed, dried, and calcined at 700° C. for 2 hours in a muffle furnace to obtain nano cerium oxide $CeO_2$; 3 g of nano cerium oxide, 1.2 g of boric acid and 2.1 g of urea were placed in mixed solution of 400 mL of ethanol and 200 ml of water, and ultrasonically dispersed for 1 h; the mixture is evaporated, dried to obtain a dried product, and then the dried product dispersed in the 100 ml aqueous solution of cobalt nitrate (3.6 mg/mL), ultrasonic agitation for 50 min, then product is evaporated, dried to obtain a solid substance; and calcined at 950° C. for 15 hours under the nitrogen atmosphere, after that, the product is washed and dried to obtain nanoparticles, the particle size is less than 100 nm, elemental analysis shows that it contains element of cobalt;

(2) adding 5 g nanoparticles into 3 g hydrogen peroxide solution (30 wt %), magnetic stirring for 0.5 to 1 h, then add 0.3 sulfuric acid solution (98 wt %), and continue to magnetic stirring for 0.5 h; then filter to obtain the filter cake, and then the filter cake is washed and dried to obtain modified particle; scanning by electron microscopy that the surface of the modified particle is rougher than the nanoparticles. When added to the water in the same way, the modified particles generate slightly more bubbles than the nanoparticles;

(3) Configure 10 mM concentration of buffer solution of Tris-HCl and the pH is adjust to 8.5 of the buffer solution with sodium hydroxide, to obtain buffer solution B; according to the mass ratio of modified particles and dopamine hydrochloride is 5:2.2, add modified particles and dopamine hydrochloride to buffer solution B, stir at room temperature for 2 h, then add curcumin ethanol solution and continue stirring 2 h; after the reaction, filtering, washing and drying to obtain organic modified particles, the mass ratio of modified particles and curcumin is 10:0.8;

(4) immersing 0.2 g silicon methoxylated aramid fiber in aqueous solution containing 0.06 g of trimethylsilanol, and shaking for 0.5 h; and then immersing in an aqueous solution of organic modified particles, the shaking at 80° C. for 2.5 h; after that washed and dried to obtain the flame-retardant ultraviolet-resistant aramid fiber.

2. Ultraviolet Irradiation of Surface-Cleaned Fibers and Modified Aramid Fibers

The clean aramid fiber and flame-retardant UV-resistant aramid fiber were exposed to a QUV/spmy type ultraviolet accelerated aging test machine (Q-Lab Corporation of the United States) for 168 h of UV irradiation (irradiance of 1.55 $W/m^2$, test temperature is 60° C.), the clean aramid fiber and modified aramid fiber irradiated for 168 h are obtained. The performance test results are as follows:

The modified aramid fiber of Example 1 has a breaking work of 1.32 times that of clean fiber and a tensile strength of 1.28 times that of clean fiber, indicating that surface modification helps to improve the breaking work and tensile strength of the fiber.

After 168 h of ultraviolet radiation, the clean fiber's breaking work and tensile strength decreased by 47.43% and 27.64%, while the breaking work of Example 1 decreased by 15.12% and the tensile strength decreased by 9.9%.

After 30 times of conventional soaping, after 168 h of ultraviolet radiation, the breaking work of Example 1 decreased by 22.02%, the tensile strength decreased by 12.29%, and the breaking work of the modified aramid fiber prepared by Example 1 of 2018104223562 decreased by 28.32%, the tensile strength decreased by 17.99%.

Using flame retardant fibers and their performance characterization methods, the modified aramid fiber of Example 1 has an oxygen index of 36, and there is no smoldering or dripping. The modified aramid fiber prepared in Example 1 of 2018104223562 has an oxygen index of 31. The clean aramid fiber has an oxygen index of 27; after conventional soaping 30 times, the oxygen index of the modified aramid fiber of Example 1 is 32, and the oxygen index of the modified aramid fiber prepared in Example 1 of 2018104223562 is 28.

Comparative Example

The method of Example 1 was used, in which step (3) replaced the modified particles with nanoparticles. After the conventional modified aramid fiber was soaped for 30 times, the oxygen index was 30, and the UV radiation breaking work at 168 h decreased by 26.88% The tensile strength decreased by 15.79%.

The method of Example 1 was used, in which step (1) without adding cobalt nitrate, after the conventional modified aramid fiber was soaped for 30 times, the oxygen index was 31, and the rupture work of UV irradiation decreased by 24.58% at 168 h. The intensity decreased by 14.02%.

Using the method of Example 1, wherein step (3) does not add curcumin, after the conventional modified aramid fiber is soaped for 30 times, the oxygen index is 30, and the UV radiation breaking work at 168 h is reduced by 27.36%. The intensity decreased by 16.89%.

Using the method of Example 1, wherein step (4) does not add trimethylsilanol, the prepared modified aramid fiber has an oxygen index of 34, and after an ordinary soaping 30 times, the oxygen index is 31.

The method of Example 1 of 2018104223562 is used, wherein the existing phosphate flame retardant is added in step (7), and the prepared modified aramid fiber has an oxygen index of 32, and after an ordinary soaping 30 times, the oxygen index is 28; Combustion agent (such as phosphorus and nitrogen), the effect is even worse.

Modified aramid fiber, as a composite material, has a complicated combustion mechanism and many process influencing factors. From the interaction between modified particles and aramid fiber and the nature of modified particles combined with the synergy of elements, it seems to be an effective method to improve flame retardant performance. For thermal and electrical properties, further research is needed; based on the preliminary work of the research group, the present invention not only solves the problems of low surface activity and poor UV resistance of aramid fibers, but also mainly improves the flame retardant properties of aramid fibers, thereby As a typical representative of high-performance organic fibers, aramid fiber can play an important role in the fields of aerospace, safety protection, electronic information, sporting goods, tire skeletons and other fields.

The invention claimed is:

1. A method for preparing a flame-retardant ultraviolet-resistant aramid fiber, comprising the following steps:
    (1) dissolving a cerium salt and an inorganic base in water, stirring for 20 to 45 min, adding hydrogen peroxide to obtain a suspension, adjusting the pH of the suspension to 10 to 14, reacting at 20 to 25° C. for 10 to 20 h, washing and filtering, drying, calcining at 500 to 800° C. for 1 to 3 h to obtain a nano-cerium oxide; dispersing the nano-cerium oxide, a boron source and a nitrogen-containing compound in a mixed solution of ethanol and water, ultrasonic agitating for 0.5 to 1.5 h, steaming and drying, then dispersing in an aqueous solution of cobalt nitrate, ultrasonic agitating for 0.5 to 1 h, then steaming and drying to obtain a solid substance; calcining the solid substance at 850 to 950° C. for 13 to 15 h under a nitrogen source gas, and then crushing to obtain nanoparticles;

(2) adding the nanoparticles into a hydrogen peroxide solution, magnetic stirring for 0.5 to 1 h, then adding sulfuric acid solution, and continuing to magnetic stir for 0.5 h; then filtering to obtain a filter cake, and then washing the filter cake and drying to obtain modified particles;

(3) adding the modified particles and dopamine hydrochloride to a buffer having a pH of 8.3 to 8.8; and stirring at room temperature for 2 to 3 hours; then adding a curcumin ethanol solution and continuing to stir for 1-2 h; and then filtering, washing and drying to obtain organic modified particles;

(4) immersing a silicon methoxylated aramid fiber in an aqueous solution of trimethylsilanol, and shaking for 0.5 to 1 h; and then immersing in an aqueous solution of the organic modified particles, then shaking at 70° C.-80° C. for 2-3 h; after that, washing and drying to obtain the flame-retardant ultraviolet-resistant aramid fiber.

2. The method according to claim 1, wherein the aramid fiber is a para-aramid fiber or a meta-aramid fiber.

3. The method according to claim 1, wherein the inorganic base is an alkali metal hydroxide selected from sodium hydroxide, potassium hydroxide or a combination thereof; the cesium salt is cerium nitrate, cerium chloride, or a combination; boron source is boric acid or metaboric acid; the nitrogen-containing compound is urea, melamine, or ammonium bromide.

4. The method according to claim 1, wherein a mass ratio of the nano-cerium oxide, the boron source, the nitrogen-containing compound, cobalt nitrate is 100:(30 to 50):(60 to 120):(10 to 13).

5. The method according to claim 1, wherein the buffer is one of Tris-HCl or disodium hydrogen phosphate-sodium dihydrogen phosphate buffer.

6. The method according to claim 1, wherein a mass ratio of the nanoparticles, hydrogen peroxide solution, and sulfuric acid solution is 100:(60 to 70):(5 to 7).

7. The method according to claim 1, wherein a mass ratio of the modified particles, dopamine hydrochloride, curcumin is 100:(30 to 50):(8 to 12).

8. The method according to claim 1, wherein a mass ratio of the silicon methoxylated aramid fiber, the organic modified particles and trimethylsilanol is 1:(2 to 9):(0.3 to 0.35).

9. The method according to claim 1, wherein a mass ratio of the cerium salt and the inorganic base is 100:(20 to 50).

10. The method according to claim 1, wherein the nitrogen source gas is nitrogen or ammonia.

* * * * *